Patented Nov. 26, 1946

2,411,566

UNITED STATES PATENT OFFICE 2,411,566

TOXIC COMPOSITION

Theodore W. Evans, Oakland, Calif., assignor to Shell Development Company, San Francisco, Calif., a corporation of Delaware No Drawing. Application August 24, 1943, Serial No. 499,857

15 Claims. (Cl. 167—22)

The present invention relates to toxic compositions and pertains particularly to toxic compositions which are especially suitable for use in fumigating and disinfecting soils.

The agents heretofore proposed for soil fumigation are not satisfactory and not widely used for various reasons, including phytocidal action on plants, localized action due to insufficient spreading and penetrating properties, expensiveness, difficulty of application, handling hazards, low toxicity, etc. A particularly troublesome soil pest is the nematode or eelworm, which is widely distributed in soils throughout the world. Its many species attack almost all plants and trees including most food crops. For example, one specie *Heterodera marioni*, which is distributed throughout the temperate, subtropical and tropical regions of the world, attacks about eight hundred plants. The attacks by nematodes weaken plants and cause them to become diseased. However, in spite of considerable effort and research, no satisfactory control of nematodes has heretofore been found.

It is therefore an object of this invention to provide an improved toxic composition, particularly suited for treating or fumigating and disinfecting soils and it is a special object of this invenution to provide a soil-treating composition capable of effectively controlling nematodes.

According to the present invention, 1,1-dihalopropene-2 and the 2-alkyl homologues thereof wherein the alkyl constituents had 1 to 3 carbon atoms are highly effective and inexpensive agents for fumigating and disinfecting soils and particularly for the control of nematodes. It will be noted that both the halo groups are on a saturated terminal carbon atom. Compounds included in this class are 1,1-dichloropropene-2, 1,1-dichloro-2-methyl propene-2, 1,1-dichloro-2-ethyl propene-2 and 1,1-dichloro-2-propyl propene-2. Instead of the chlorides listed in the above examples, the corresponding bromides, iodides or fluorides may be used or mixed halogen compounds, such as those containing both chlorine and bromine, for example, may be employed.

The 1,1-dihalopropene-2 and its 2-alkyl homologues may be used alone or in admixture with other materials, such as diluents, e. g. lower hydrocarbons which may be halogenated, other insecticides, etc. Small amounts of stabilizers, such as, for example, epichlorhydrin, propylene oxide, ethylene oxide, methyl vinyl ketone, acrolein, amyl amine, ammonia, dimethyl amine, ethanol amine, dihydroisophoronyl amine, glycerol, lime water, and in some cases water alone, etc., may be used. In general, hydrochloride-acceptors may be used as stabilizers for these compounds.

These compounds may be prepared in any suitable manner; for example, 1,1-dichloropropene-2 may be prepared by chlorination of allyl chloride, by the reaction of acrolein and phosphorous pentachloride, etc.

These compounds, or mixtures containing them, combine high toxicity to soil pests with low phytocidal action. Thus, these agents are highly effective in controlling nematodes, as well as other soil pests and insects, such as wire worms, fire ants, various species of root-rotting fungi, oak-root fungus in peach and citrus trees, etc. On the other hand, in the required concentration the present compounds are relatively non-injurious to plants either directly or through deleterious action upon the physical properties of the soil. A particular advantage of these present soil fumigating agents is that, if used properly, they do not adversely affect the plants, such as by overstimulation. Another advantage of the present agents, particularly those having not more than 4 carbon atoms, is that they have optimum spreading and penetrating properties due to their volatility range and vapor pressure at ordinary soil temperatures. Further, these compounds are relatively safe to handle if certain simple precautions are taken, such as avoiding breathing of the fumes and promptly washing off with water any liquid spilled on the hands or skin. Further, since mixtures containing the present agents have relatively high flash points, no more than the usual precautions, such as are taken with common organic solvents, need be taken in handling. An especially unexpected advantage of these compounds when used in treating soils is their effect on harmful soil bacteria and unfavorable soil complexes.

A particularly important advantage of the present agents resides in their ease of application in soil treatment, there being no necessity to use a soil cover to prevent rapid dissipation of the agents. Thus, any suitable method of applying these compounds or mixtures thereof to the soil may be used. For example, a simple but effective method comprises punching holes in the soil at frequent intervals, such as one foot apart, and pouring a measured amount of the agents into said holes. Subsoil injectors of any suitable type, either hand operated or mechanically operated, may likewise be used. In some cases, the agents may be emulsified with any suitable soap or other emulsifier and applied to the soil such as by adding to the irrigation water. Also, these compounds are generally sufficiently soluble to permit applying the agents to soil by adding them dropwise to irrigation water and distributing the treated water over the soil surface. The application may be carried out by spraying the soil with an oil solution or aqueous emulsion of the present agents. On the other hand, it may be desired to absorb the agents on inert carriers such as talc, bentonite or other porous clays, etc., and the dust may be worked into the soil during cultivation or fertilization. The dust or powder may also be compacted into pellets, which may be made to distintegrate on contact with water, and the pellets dropped into a furrow behind a plow. Another suitable method of application comprises dripping the liquid agents into a furrow directly behind a plow.

These agents may be applied to fields at the rate of 50 to 400 pounds per acre and preferably from 100 to 200 pounds per acre. However, the use of lesser amounts will often give less striking but advantageous results. The higher concentrations of these agents should be applied preferably only after small plot tests have been made.

I claim as my invention:

1. A soil fumigant comprising an emulsion of a compound selected from the group consisting of 1,1-dihalopropene-2 and the 2-alkyl homologues thereof, wherein the alkyl substituent has one to three carbon atoms.

2. A process of fumigating and disinfecting soil comprising impregnating said soil with a compound selected from the group consisting of 1,1-dihalopropene-2 and the 2-alkyl homologues thereof, wherein the alkyl substituent has one to three carbon atoms.

3. A process of fumigating and disinfecting soil comprising irrigating said soil with water to which has been added a compound selected from the group consisting of 1,1-dihalopropene-2 and the 2-alkyl homologues thereof, wherein the alkyl substituent has one to three carbon atoms.

4. A process of fumigating and disinfecting soil comprising irrigating said soil with water to which has been added an aqueous emulsion of a compound selected from the group consisting of 1,1-dihalopropene-2 and the 2-alkyl homologues thereof, wherein the alkyl substituent has one to three carbon atoms.

5. A process of treating soil comprising spraying said soil with an emulsion of a compound selected from the group consisting of 1,1-dihalopropene-2 and the 2-alkyl homologues thereof, wherein the alkyl substituent has one to three carbon atoms.

6. A process of eradicating nematodes from the soil and minimizing attack thereby on plants, comprising introducing below the soil surface in the vicinity of said nematodes an agent selected from the group consisting of 1,1-dihalopropene-2 and the 2-alkyl homologues thereof, wherein the alkyl substituent has one to three carbon atoms.

7. A process of eradicating nematodes from the soil and minimizing attack thereby on plants, comprising introducing below the soil surface in the vicinity of said nematodes, a nematocidal amount of 1,1-dihalopropene-2.

8. A process of eradicating nematodes from the soil and minimizing attack thereby on plants, comprising introducing below the soil surface in the vicinity of said nematodes, a nematocidal amount of 1,1-dichlorpropene-2.

9. A process of eradicating nematodes from the soil and minimizing attack thereby on plants, comprising introducing below the soil surface in the vicintiy of said nematodes, a nematocidal amount of 1,1-dihalo-2-alkylpropene-2, wherein the alkyl substituent has one to three carbon atoms.

10. A process of eradicating nematodes from the soil and minimizing attack thereby on plants, comprising introducing below the soil surface in the vicinity of said nematodes, a nematocidal amount of 1,1-dichloro-2-alkylpropene-2, wherein the alkyl substituent has one to three carbon atoms.

11. A process of eradicating nematodes from the soil and minimizing attack thereby on plants, comprising introducing below the soil surface in the vicinity of said nematodes, a nematocidal amount of 1,1-dichloro-2-methylpropene-2.

12. A soil fumigant comprising an emulsion of 1,1-dihalopropene-2.

13. A soil fumigant comprising an emulsion of 1,1-dichloropropene-2.

14. A soil fumigant comprising an emulsion of 1,1-dihalo-2-alkylpropene-2, wherein the alkyl substituent has one to three carbon atoms.

15. A soil fumigant comprising an emulsion of 1,1-dichloro-2-methylpropene-2.

THEODORE W. EVANS.